June 5, 1951  E. M. IRWIN  2,555,853
MAGNETIC TESTING APPARATUS AND METHOD
Filed April 16, 1945
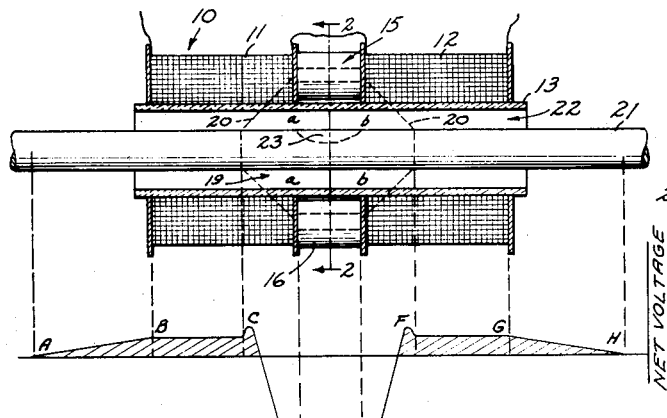
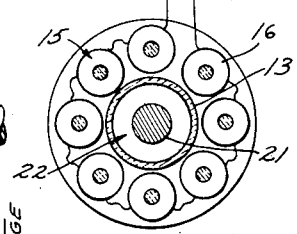
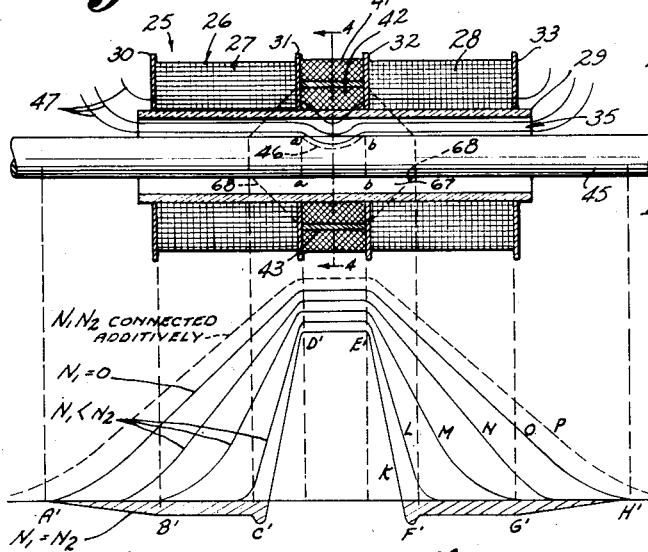
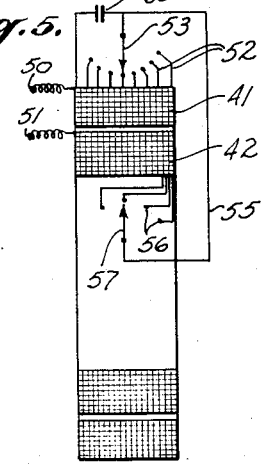
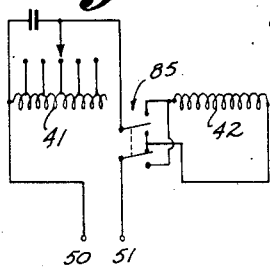
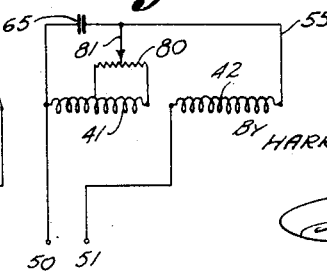
INVENTOR:
EMMETT M. IRWIN,
BY HARRIS, KIECH, FOSTER & HARRIS,
FOR THE FIRM
ATTORNEYS Patented June 5, 1951

2,555,853

UNITED STATES PATENT OFFICE 2,555,853

MAGNETIC TESTING APPARATUS AND METHOD

Emmett M. Irwin, San Marino, Calif.

Application April 16, 1945, Serial No. 588,569

19 Claims. (Cl. 175—183)

My invention relates to magnetic testing equipment and, more particularly, to a test unit particularly adapted for the testing of a specimen of magnetic material to detect changes in its magnetic properties or to detect zones of magnetic disconformity therein which are indicative of zones of flaw, incipient failure, improper heat treatment, etc. The new test unit offers a number of advantages over those heretofore in use in that it permits testing of the specimens in different ways for different purposes, and also makes possible the testing of specimens without the use of a second test unit of identical construction and conventionally employed as a reference.

In magnetic testing equipment now in use, it is customary to employ a primary or exciting winding for passing magnetic flux through the specimen, and a secondary winding within the field of excitation of the primary winding, the potential induced in the secondary winding varying with the magnetic characteristics of that portion of the specimen in a so-called pick-up zone of the secondary winding. In highly selective testing, it is often very desirable that the pick-up zone be narrow, particularly when a relatively long specimen is moved through the magnetic testing equipment. A defect in a specimen may be present in a very narrow band thereof, and it is desirable that this defect produce no response in the secondary winding except when it is present in a relatively narrow pick-up zone. It is also desirable that such a defect passing through the pick-up zone produce a single definite electrical pulse readily observable on suitable indicating equipment or readily adapted to the automatic marking or rejection of the specimen if the defect is too pronounced. Unfortunately, these conditions have heretofore not been met in practice.

For example, the patent to Knerr, No. 2,124,579, discloses a ring coil secondary winding comprising a plurality of serially-connected individual coils disposed around the test zone containing the specimen, with magnetic axes parallel to the axis of the test zone. My experience shows that, while the main pick-up zone of such a secondary winding is relatively narrow and will produce an electrical pulse in a given direction when a defect is moved therethrough, nevertheless such a system cannot be considered fully satisfactory for truly narrow-band testing, nor is it invariably infallible in detecting the presence of a small defect in the narrow band for several reasons.

In the first place, a smaller potential is induced in such a ring coil secondary winding because of the defect both before and after the defect enters and leaves the main pick-up zone. In other words, such a ring coil secondary winding is not responsive exclusively to defects transiently present in the main pick-up zone, as will be later illustrated more in detail, but is responsive also to defects or variations in magnetic characteristics of the specimen at positions relatively far removed from the main pick-up zone, namely, in auxiliary pick-up zones on each side thereof.

In the second place, the potential-inducing flux changes, arising from a defect moving through either auxiliary zone, are opposite in polarity to those appearing when the defect is in the main pick-up zone. As a consequence, the indicating or control equipment receives an uncertain or varying signal, e. g., a potential in one direction as the defect moves toward the main pick-up zone, a larger potential in the opposite and desired direction as the defect moves through the main pick-up zone, and a later potential, again of reversed direction, as the defect moves through the other auxiliary pick-up zone. Not only does this tend to defeat positive response of the indicating or control equipment, but it also tends to destroy the desired accuracy. For example, a defect in the main pick-up zone may be partially or completely balanced, in its effect on the voltage induced in the secondary winding, by another defect in one of the auxiliary pick-up zones.

It is one object of the invention to provide a test unit which substantially eliminates the presence of any induced potential until a zone of magnetic disconformity, present in a relatively narrow band, actually enters a narrow pick-up zone. In other words, this object of the invention contemplates the elimination of the auxiliary pick-up zones heretofore mentioned. In this embodiment of the invention, the test unit is usually employed in a system containing a second test unit acting as a standard or reference, the potentials induced in the secondary windings of each unit being balanced against each other. It is an object of the invention to provide such a system.

It is another object of the invention to provide a magnetic test unit which employs a single pair of secondary test windings or coils arranged at different radial spacings from the axis of the test zone, whereby such coils are differently affected by flux variations arising from a zone of magnetic disconformity in a specimen undergoing test or arising from a change in magnetic properties of a specimen or member in the test zone of the unit.

I have discovered that such paired, dissimilarly-spaced test windings can be arranged or constructed to make the test unit self-balancing, thus requiring no balancing connection to a similar reference test unit. Heretofore, it has been the practice in this art to employ such a reference test unit containing a reference specimen and to connect this to some form of test unit containing the test specimen in such way as to oppose the output potentials of the two units, and thereby obtain a net potential representative of a defect in the test specimen. This leads not only to the inconvenience and additional expense of a second test unit but also to inaccuracies upon the existence of non-uniform conditions in the two test units, e. g., the presence of differential temperatures in the two units arising from the heating of one more than the other.

It is an object of the present invention to provide a self-balancing magnetic test unit responsive to changes in magnetic properties of a member in a test zone, and which requires no balancing connection to another test unit serving as a standard or reference.

I have discovered that, if two secondary test windings or coils are arranged at different radial spacings from the axis of the test zone, the amplitudes and phase relationships of the potentials induced respectively therein can be adjusted or selected so that the unit is self-balancing. It is an object of the present invention to change the effective number of turns on one such winding so that the amplitude of its induced output potential is substantially equal to that of the other winding, and to balance such potentials against each other, as by connecting the windings in series opposition, to obtain a net potential. It is also an object of the invention to connect a condenser across one of such windings to bring its induced output potential substantially into phase with that of the other winding, or to employ other phase-shifting means in this connection.

Further objects and advantages of the invention will be evident to those skilled in the art from the following description of an exemplary embodiment. While the invention will be first exemplified with reference to the detection of defects in a specimen moving through a test zone, it is equally applicable to the detection of any changes in magnetic properties of a member in a test zone, irrespective of movement thereof along the test zone.

Referring to the drawing:

Fig. 1 shows, in vertical section, a test unit employing a conventional ring-coil secondary and, immediately therebeneath, a graphical representation of the response of the unit to a defect moving longitudinally through the test zone;

Fig. 2 is a vertical sectional view, taken on the line 2—2 of Fig. 1, illustrating the ring-coil secondary;

Fig. 3 shows, in vertical section, one embodiment of the test unit of the present invention and, immediately therebeneath, a graphical representation of the response of such a test unit with various turn ratios as between the two secondary coils;

Fig. 4 is a vertical sectional view of the concentric secondary coils, taken on the line 4—4 of Fig. 3;

Fig. 5 is an enlarged vertical sectional view of the concentric secondary coils, showing the preferred connections therefor;

Fig. 6 is a wiring diagram showing an alternative connection of the secondary coils for opposed or additive connection; and Fig. 7 is a wiring diagram showing an alternative method of changing the number of effective turns on one secondary coil with respect to the other.

Reference to Figs. 1 and 2 will make clear the relationships which I have found to exist in test units employing ring-coil secondaries. For example, such a test unit may employ a conventional primary winding 10 composed of additively-connected sections 11 and 12 wound on a tube of non-magnetic material 13 and energized from a suitable source of cyclically-varying potential, conventionally a commercial-frequency source of alternating current. Disposed between the sections 11 and 12 is a ring-coil secondary winding 15 comprising a plurality of individual coils 16 disposed around the tube 13 and connected serially and additively, the magnetic axes of these coils being parallel. The relatively narrow main pick-up zone of this type of ring-coil secondary is indicated at 19 between dotted lines 20. Figs. 1 and 2 show a specimen 21 extending through a test zone 22 provided by the tube 13. This specimen is shown as providing a soft spot or zone 23 on one side thereof and in a narrow band between lines a—a and b—b. Such a soft zone 23 represents one type of defect or zone of magnetic disconformity and its presence serves to draw into the specimen 21 at the soft zone some of the air-borne flux established by the primary winding 10 and present in the test zone 22 around the specimen 21. As such a soft zone or other zone of magnetic disconformity moves along the test zone 22, it changes the flux pattern established by the primary coil 10 in such way as to change the voltage induced in the ring-coil secondary winding 15. It is conventional to employ the test unit of Fig. 1 with a reference unit comprising an identical test unit containing a specimen similar to 21 but of known or desired magnetic properties, the outputs of the two ring-coil secondary windings of the two units being connected together in series opposition to produce a net potential.

I have found that such a system does not give a strictly accurate narrow-band test, but that the net voltage is influenced by defects quite removed from the main pick-up zone 19. For example, in the lower half of Fig. 1 is plotted a curve typical of this response, ordinates representing net voltages arising from variations of magnetic flux through the ring-coil secondary as the defect 23 moves through the test unit. Even when the defect is at point A, substantially removed from the primary winding 10 and representing the point where the magnetic flux enters or leaves the specimen, the flux through the ring-coil secondary winding 15 begins to vary to influence the output potential thereof. The net voltage increases from point A to point B, opposite one end of the primary winding 10, and then remains substantially constant until just before point C at the boundary of the main pick-up zone 19. The voltage then suddenly humps and reverses to reach point D, after which it remains substantially constant to point E during movement of the defect through the zone immediately inside the ring-coil secondary winding 15. It again reverses and humps when the defect moves opposite point F, after which it remains substantially constant to point G, and then drops to point H. The voltage changes between C and F are relied upon to create a signal or electrical pulse indicating the defect, its placement, and its magnitude or character. It will be observed that the net voltage leading to this desired signal is in one direction, i. e., below the base line, while voltages of opposite polarity, indicated by the shaded portions of the curve, are present in what are hereinafter termed as "auxiliary pick-up zones" extending from a point opposite A to a point opposite C and from a point opposite F to a point opposite H. It is at once apparent that a signal or response from a given defect in the main pick-up zone may be partially or completely obliterated or counteracted because of another defect in one of the auxiliary pick-up zones, thus leading to inaccuracy and uncertainty as regards the signal actually obtained and its relationship to detection of particular flaws or defects.

Such difficulties are solved by the present invention, one embodiment of which is illustrated in Fig. 3. Referring thereto, the test unit is generally indicated by the numeral 25 and includes a primary winding 26 comprising additively connected sections 27 and 28 surrounding a tube 29, respectively between collars 30, 31 and 32, 33. The tube 29 and the collars are formed of non-magnetic material, the interior of the tube forming a test zone 35. Disposed between the collars 31 and 32 are two secondary test windings or coils spaced different distances from the axis of the test zone and shown, respectively, as an outer coil 41 having $N_1$ effective turns and an inner coil 42 having $N_2$ effective turns, these coils being separated by a ring-type spacer 43. Each of these secondary coils is formed of a plurality of turns of wire wound in layers concentric with the axis of the test zone 35. While the concentric secondary coils 41 and 42 are shown as lying between and substantially opposite the sections 27 and 28 of the primary winding, other arrangements can be employed so long as the primary winding sends a cyclically-varying flux through the test zone and through a specimen or member 45 extending therein, and so long as one of the secondary windings is spaced a further distance from the axis of the test zone than is the other so as to be differently acted upon by changes in the flux pattern in the test unit arising from a change in magnetic properties of any member 45 therein. In referring to windings spaced different distances from the axis of the test zone, I have reference to different spacings measured with respect to a mean turn of each winding. The inner-outer relationship of the windings shown in Fig. 3 will give a maximum difference in spacing and is preferred.

When the primary winding 26 is energized, for example, from a source of alternating potential, a magnetic field will be established in the test zone 35, the magnetic flux building up and collapsing cyclically with the current in the primary winding 26. A portion of this flux enters the member 45 and flows therealong through that portion thereof in the test zone 35. Another portion of the flux flows through the outer portion of the test zone between the periphery of the member 45 and the tube 29, while another portion traverses the inner portion of the primary winding 26 itself. The flux varies from a given or normal flux pattern upon change in the magnetic properties of the member 45 in the test zone. For example, if the member 45 provides a soft zone 46 in a relatively narrow band between lines $a$—$a$ and $b$—$b$, the magnetic flux will tend to be drawn into this soft portion 46 to change the flux pattern, somewhat as suggested in Fig. 3, where typical flux lines are indicated by the numeral 47.

In the preferred embodiment, the invention comprehends the employment of suitable means for varying the effective number of turns of one of the secondary coils 41, 42 with respect to the other and for connecting these coils in series opposition to produce a net potential across output terminals 50 and 51, shown diagrammatically in Fig. 5. Tapping of one or both coils is the preferred way of accomplishing this. For example, every twentieth turn of the outer coil 41 may be tapped and, for ready adjustment, the taps are connected to contacts 52 selectively engageable by an arm 53. By this arrangement, an adjustable portion of the outer coil 41 electrically between the output terminal 50 and the arm 53 can be connected in series opposition with the inner coil 42, as by lead 55. If desired, the total number of turns in the inner coil 42 can be thus permanently connected in series opposition to the adjustable-turn outer coil 41. However, for more universal use of the test unit, it is sometimes desirable, as suggested in Fig. 5, to provide a number of taps on the inner coil 42. For example, the first twenty turns may be individually tapped, the taps being connected to contacts 56 selectively engageable by an arm 57 to which the lead 55 is connected. A vernier-type adjustment of the ratio of effective turns on the two coils can thus be obtained, or this same result can be effected by closer tapping of the outer coil 41 alone.

The preferred embodiment of the invention also contemplates partial or substantially complete equalization of the amplitude of the potentials induced in the secondary coils 41 and 42, and this can conveniently be accomplished by tap changing. It is also preferable that the potentials induced in the secondary coils 41 and 42 shall be brought substantially in phase with each other. While various means can be employed in accomplishing this result, the preferred arrangement is to connect a condenser 65 across one of the coils 41 or 42 or across the effective turns thereof, as suggested in Fig. 5, the capacitance of this condenser being selected or adjusted to provide the desired degree of phase equalization.

Some of the general relationships of the voltages and some of the advantages of the invention appear from the curves at the bottom of Fig. 3. If the number of turns in the differentially-connected coils 41 and 42 is made equal (i. e., $N_1 = N_2$) and if these coils are connected in series opposition to similarly differentially-connected coils of a similar reference test unit containing a member of known magnetic properties, the resulting net voltage output will be closely analogous to that of the ring-coil secondary winding 15 previously described. Thus, a given defect in the member 45, e. g., the soft zone 46 therein, will, if this defect is moved through the test zone, produce a variation in net voltage indicated by curve K at the bottom of Fig. 3. Comparison of this curve with that of Fig. 1 will show a marked similarity except that the curve is reversed relative to the abscissa axis. Correspondingly, for extreme narrow-band testing, the concentric secondary coils 41, 42, if having an equal number of turns, have very little advantage over the ring-coil secondary 15 of Figs. 1 and 2. Under such circumstances, the test unit 25 will still provide both a main pick-up zone, indicated in Fig. 3 by the numeral 67 and bounded by dotted lines 68, and two auxiliary pick-up zones on opposite sides thereof, as evidenced by the shaded areas bounded by curve K between points A' and C' and between points F' and H'.

I have discovered, however, that, if the number of effective turns in the outer coil 41 is made appropriately less than the number of effective turns of the inner coil 42 and the test unit is connected to a reference test unit as before to effect a balance, these auxiliary pick-up zones are non-existent and the test unit responds only to defects when in the main pick-up zone 67. In other words, by slightly reducing the number of turns on the outer coil 41 relative to the inner coil 42, the variation in net voltage output follows curve L, i. e., variations in flux because of this defect give no response until the defect reaches a position approximately opposite point C', whereupon the curve rises to a value somewhat higher than D' or E', and then drops symmetrically to the abscissa axis approximately opposite point F'. Correspondingly, under such conditions the test unit becomes truly a narrow-band testing arrangement, and the response from a defect in the main pick-up zone 67 is positive and unambiguous and can be made to produce a signal which is not influenced by other defects spaced from the main pick-up zone. When the test unit is operating in this way, it can be said to be partially self-balancing although, for extreme narrow-band testing evidenced by the curve L, the voltages of the inner and outer coils are not exactly equal so that the test unit cannot be completely self-balanced in the manner to be hereinafter described. For this reason, when the test unit is employed for extreme narrow-band testing, it is desirable to employ an identical test unit containing a member of known or desired magnetic properties, this other unit acting as a standard or reference. The net voltage output of the two units can be sent to a suitable analyzing circuit or to suitable indicating or control means for respectively indicating or controlling appropriate specimen-marking or specimen-rejecting equipment.

If a wider-band testing is desired, I have found that this can be accomplished by further and progressive reduction in the number of turns in the outer test coil 41 relative to the inner test coil, producing a family of responses represented by curves M, N, and O, the curve O showing the effect of completely eliminating the outer coil 41 from the circuit. For extremely broad-band or overall testing, the test coils 41 and 42 may be connected additively in series, as will be later described with reference to Fig. 6, thus producing the type of response suggested by dotted curve P. The curves L, M, and N at the bottom of Fig. 3 are net voltage curves, such as would be produced if the induced voltages are balanced to zero when the normal flux pattern exists in the test zone, such balancing being effected by external means, e. g., the analyzing circuit, to the extent necessary. However, as later mentioned, one such curve may result from a ratio of effective turns which gives a self-balancing effect but, for the other of such curves, some external balancing will be necessary, e. g., the analyzing circuit can be adjusted to supply the voltage necessary to compensate for unbalance in the outputs of the two differentially-connected coils 41 and 42, to the end that the net response will be zero when the normal flux pattern exists in the test zone. In obtaining curve O, the external means must supply a voltage equal to that induced in the coil 42 alone and, in obtaining curve P, the external voltage will be equal to the additive voltages of the coils 41 and 42. In addition, it should be noted that the ordinate scales of curves L, M, N, O, and P are compressed in varying degrees as compared with curve K, so that the relative heights of these curves are not exactly correct to the scale shown. The actual peak of curve O, for example, is usually two or three times that of curve K and the actual peak of dotted curve P, representing additive connection of the coils, may be about double that of curve O. The actual peak values will vary with the number of connected effective turns of the two coils, and the ordinate scale has been compressed to facilitate illustration, the curves showing the general variations in shape rather than exactly correct peak values.

I have found that the test unit can be made self-balancing by appropriate balancing of the induced potentials in the outer and inner test coils 41 and 42 against each other. This completely eliminates the necessity of employing the test unit in conjunction with a reference unit or in conjunction with an analyzing circuit adjusted to supply a balancing potential.

The most important criterion for such a self-balancing test unit is substantial equalization of the amplitude of the induced voltages across the effective turns of the pick-up coils 41 and 42. This amplitude balancing should be done while a member 45, or section thereof, of known or desired magnetic properties is disposed in the test zone and is preferably accomplished by relatively changing the effective number of turns of the two test coils 41 and 42. The ratio of effective turns giving the desired balance will vary with the type and shape of the specimen or member, the closeness of the test coils thereto, the spacing between the test coils, and with other factors. However, with a given specimen, member, or section thereof in the test zone, the effective number of turns on the test coils 41 and 42 can be varied so as to give a net voltage between output terminals 50 and 51 which is zero or very close thereto. Any subsequent change in the flux pattern in the test zone, arising from a change in magnetic properties of the previously-present member or because a subsequently inserted member having different magnetic properties, will be reflected in the net potential between the output terminals 50 and 51. This net potential can be supplied to a suitable analysis circuit or to suitable indicating or control means, as previously mentioned.

The induced potentials in the test coils 41 and 42 may be slightly out of phase with each other and, for greatest accuracy, I prefer to balance the test unit additionally to bring the two induced voltages substantially into phase with each other. While this can be done by adjustments of the analyzing circuit, it is preferable in some cases to provide for this phasing in the test unit itself so that the test unit can be made self-balancing in the fullest sense and so that its output terminals 50, 51 can be connected to suitable indicating and control equipment. I have found that the condenser 65, if of appropriate capacitance, can be connected across the effective turns of one of the coils 41 or 42, such as the outer coil 41, as shown in Fig. 5, to accomplish this phasing of the potentials of the two test coils.

It should be understood that various means can be employed for changing the effective number of turns on one of the test coils relative to the other. Instead of the preferred tapping suggested in Fig. 5, the effective number of turns can be varied by the scheme suggested in Fig. 7. Here, a portion of the turns of the outer coil 41 is shunted by a potentiometer winding 80, the arm of the potentiometer, indicated by the numeral 81, being connected to the lead 55 and, if desired, to the condenser 65. Adjustment of the arm 81 can be said to vary the effective number of turns on the coil 41 by adjusting the output potential thereof.

In some instances, it is desirable to employ a switching system, suggested in Fig. 6, for selective connection of the coils 41, 42 in series opposition or additively, particularly when the test unit is to be employed selectively for narrow-band or overall testing. Fig. 6 diagrammatically shows a double-blade reversing switch 85 in circuit with the coils 41, 42. When in the position shown, the effective turns of these coils are connected additively for an overall or wide-band test. When the switch blades are moved to their other position, the effective turns of the coils 41, 42 will be in series opposition.

Various changes and modifications can be made without departing from the spirit of the invention as defined in the appended claims.

I claim as my invention:

1. In a device for accurate narrow-band testing of a specimen of magnetic material when moved along an axis of a test zone, the combination of: means for sending magnetic flux longitudinally through said test zone and through said specimen when moving along said axis; a pair of test windings spaced different distances from the axis of said test zone, said windings providing a narrow main pick-up zone flaring into auxiliary pick-up zones in said test zone; means for opposing the voltages induced in said two test windings and for balancing the resultant voltage against an external voltage to obtain a net voltage, said test windings if of equal number of effective turns producing a net voltage in one direction when a small zone of magnetic disconformity of the specimen moves through said main pick-up zone and producing a net voltage in an opposite direction during movement of said small zone through said auxiliary pick-up zones on each side of said main pick-up zone; and means for changing the effective number of turns on one of said test windings relative to the other to substantially eliminate said net voltage in said opposite direction during movement of said small zone of magnetic disconformity through said auxiliary pick-up zones.

2. A self-balancing magnetic test unit requiring no balancing connection to another test unit serving as a standard and responsive to changes in flux pattern in a test zone arising from changes in magnetic properties of a member extending in the test zone, which self-balancing magnetic test unit includes in combination: means for sending a cyclically-varying magnetic flux through said test zone and said member therein, the flux pattern in said test zone changing upon change in the magnetic properties of said member; a pair of test windings spaced different distances from said member to be linked by different amounts of said flux and to be differently influenced by changes in said flux pattern; means for changing the number of effective turns on one of said windings relative to the other to make the number of effective turns of said windings unequal and substantially equalize the amplitude of the voltages induced in each winding by a given flux pattern; and means for balancing said induced voltages against each other to obtain a net voltage which is substantially zero when said given flux pattern is present but which varies in the presence of other flux patterns arising from change in the magnetic properties of said member.

3. A combination as defined in claim 2, including in addition means for adjusting the phase of one of said induced voltages relative to the other to bring both induced voltages substantially in phase with each other when said given flux pattern is present.

4. A self-balancing magnetic test unit requiring no balancing connection to another test unit serving as a standard and responsive to changes in flux pattern in a test zone arising from changes in magnetic properties of a member extending in the test zone, which self-balancing magnetic test unit includes in combination: a primary winding for sending a cyclically-varying magnetic flux through said test zone and said member therein, the flux pattern in said test zone changing upon change in the magnetic properties of said member; a single pair of inner and outer test windings surrounding and spaced different radial distances from said member to be linked by different amounts of said flux; means for changing the number of effective turns on said outer test winding relative to the number of effective turns on said inner test winding to make the number of effective turns of said windings unequal and substantially equalize the amplitude of the voltages induced in each winding by a given flux pattern; means for bringing said induced voltages substantially into phase with each other when said given flux pattern is present; and means for balancing said induced voltages against each other to obtain a net voltage which varies with changes in said flux pattern arising from changes in the magnetic properties of said member in said test zone.

5. In magnetic testing apparatus for testing a member in a test zone, the combination of: means for sending magnetic flux through said test zone and said member therein; a pair of secondary test windings within the resulting flux field and disposed different distances from the axis of said test zone, the test winding more removed from said axis having a smaller number of effective turns than the other test winding; and means for balancing the induced voltages of said test windings against each other to obtain a net voltage varying with changes in the flux pattern in said test zone.

6. In magnetic testing apparatus for testing a member in a test zone, the combination of: means for sending magnetic flux through said test zone and said member therein; a pair of secondary test windings within the resulting flux field and disposed different distances from the axis of said test zone; means for changing the effective number of turns on one of said test windings relative to the other to make the number of effective turns on the outermost winding less than on the innermost winding; and means for balancing the induced voltages of said test windings against each other to obtain a net voltage varying with changes in the flux pattern in said test zone.

7. In magnetic testing apparatus for testing a member in a test zone, the combination of: means for sending magnetic flux through said test zone and said member therein; a single pair of secondary test windings within the resulting flux field and disposed different distances from the axis of said test zone; means for varying the output potential of one of said test windings relative to the other; and means for connecting said test windings in series opposition to obtain a net voltage varying with changes in the flux pattern in said test zone.

8. An apparatus as defined in claim 5, including also a means for bringing the voltages induced in said test windings substantially in phase with each other.

9. An apparatus as defined in claim 6, including also a means for shifting the phase of the voltage induced in one test winding relative to that induced in the other test winding to bring these voltages substantially into phase with each other.

10. In magnetic testing apparatus for testing a member in a test zone, the combination of: means for sending flux through said test zone and said member therein; inner and outer test windings concentric with the axis of said test zone to be differently affected by changes in the flux pattern in said test zone, one of said test windings having a plurality of taps connected to turns thereof; and means for connecting said test windings in series opposition through a selected tap of said one of said windings, said tap being selected to produce substantially equal induced voltages in said test windings when a given flux pattern is present in said test zone, thereby producing a net output voltage from said test windings, said net output voltage being substantially zero when said given flux pattern is present but varying upon change in flux pattern arising from a change in magnetic properties of said member in said test zone.

11. In a magnetic test unit for testing a member in a test zone, the combination of: a primary winding surrounding said test zone for sending a cyclically-varying magnetic flux through said test zone and said member therein; inner and outer test windings concentric with the axis of said test zone to be differently affected by changes in the flux pattern in said test zone, each of said test windings providing a plurality of taps connected to turns thereof; a pair of output terminals; and means for connecting said test windings across said output terminals in series opposition through selected taps of each of said windings.

12. In a magnetic test unit for testing a member in a test zone, the combination of: a primary winding surrounding said test zone for sending a cyclically-varying magnetic flux through said test zone and said member therein; concentric inner and outer test windings concentric with the axis of said test zone, said test windings having substantially the same axial extent and being adapted to be differently affected by changes in the flux pattern in said test zone; and means for varying the length of the test zone by selectively connecting said test windings in series additive and series opposition relationship.

13. A method of directly detecting changes in magnetic properties of a member in a test zone as counterdistinguished from such detection by comparison with the properties of a reference member in another test zone, which method includes the steps of: sending a cyclically-varying magnetic flux through said test zone and said member therein, the flux pattern in said test zone changing upon change in the magnetic properties of said member therein; employing flux changes at different radial distances from the axis of said test zone and in substantially a single plane to produce induced voltages; balancing said induced voltages against each other to obtain a net voltage; varying one of said induced voltages relative to the other to substantially balance said voltages in amplitude and phase when said given flux pattern is present, thus producing a net voltage which is substantially zero; and employing changes in said net voltage upon change in said flux pattern to determine changes in magnetic properties of said member in said test zone.

14. A magnetic testing apparatus as defined in claim 5 in which the number of turns on said windings are such as to substantially equalize the voltages induced in the two windings to make said testing apparatus self-balancing, as distinct from requiring balancing against another similar magnetic testing apparatus.

15. In a magnetic testing apparatus for testing a member in a test zone, the combination of: means for sending a cyclically varying magnetic flux through said test zone and through said member therein, the flux pattern in said test zone changing with change in the magnetic properties of said member, first means responsive to said varying flux in a main pick-up zone and in auxiliary pick-up zones at the sides thereof, and second means concentric to said first means and responsive to said varying flux to a different degree than said first means in said main pick-up zone and responsive to the varying flux in the auxiliary zones to substantially the same degree as the first means, and means connecting said first and second means in opposition to effect the cancellation of the responses in said first means to the flux in said auxiliary zones only.

16. In a magnetic testing apparatus for testing a member in a test zone, the combination of: means for sending a cyclically varying magnetic flux through said test zone and through said member therein, the flux pattern in said test zone changing with change in the magnetic properties of said member, first means responsive to the flux in a narrow main pick-up zone to generate a voltage and responsive to the flux in auxiliary pick-up zones at the sides of said main pick-up zone to generate an additive voltage, and second means within the projected length of said first means as measured in the direction of the flux field and responsive to the flux in said narrow main pick-up zone to generate a voltage in opposition to and equal to said voltage with a standard flux pattern only in said main zone and responsive to the flux in said auxiliary pick-up zones to generate a voltage in opposition to and equal to said additive voltage with standard and also non-standard flux patterns in said auxiliary pick-up zones.

17. The construction recited in claim 16 characterized in that said first means comprises a test winding concentric to said main pick-up zone and in that said second means comprises a second test winding having a different number of effective turns and lying in substantially the same radial plane as said first means.

18. The construction recited in claim 17 characterized in that means are provided to vary the number of effective turns of one of said windings.

19. A method of directly detecting variations in magnetic properties of an elongated member movable longitudinally through a test zone as counterdistinguished from such detection by comparison with the properties of a reference member in another test zone, which method comprises the steps of: sending a cyclically-varying magnetic flux longitudinally through said test zone and said member therein, moving said member and said test zone relative to each other longitudinally so as to bring successive lengths of said member into said zone, the flux pattern in said test zone changing upon change in the flux-conducting properties of said member therein, employing the cyclically-varying flux in a narrow band in said test zone as modified by the length of said member therein to induce voltages in elements traversed by said flux at different radial distances from said member and in a narrow band comprising substantially a single plane, opposing said induced voltages to obtain a net voltage, and employing changes in said net voltage unmodified by any voltage related to flux-conducting properties of said member outside said narrow band to determine changes in the flux-conducting properties of said member in said narrow band of said test zone.

EMMETT M. IRWIN.

REFERENCES CITED

The following references are of record in the file of this patent:

UNITED STATES PATENTS

| Number | Name | Date |
| --- | --- | --- |
| 1,925,904 | Mayne | Sept. 5, 1933 |
| 1,992,100 | Stein | Feb. 19, 1935 |
| 2,065,118 | Davis | Dec. 22, 1936 |
| 2,102,450 | Zuschlag | Dec. 14, 1937 |
| 2,102,452 | Zuschlag | Dec. 14, 1937 |
| 2,124,577 | Knerr | July 26, 1938 |
| 2,315,943 | De Lanty | Apr. 6, 1942 |